No. 849,098. PATENTED APR. 2, 1907.
C. G. AUFRICHTIG.
COMBINED FORK, SPOON, KNIFE, AND CAN OPENER.
APPLICATION FILED MAR. 8, 1906.
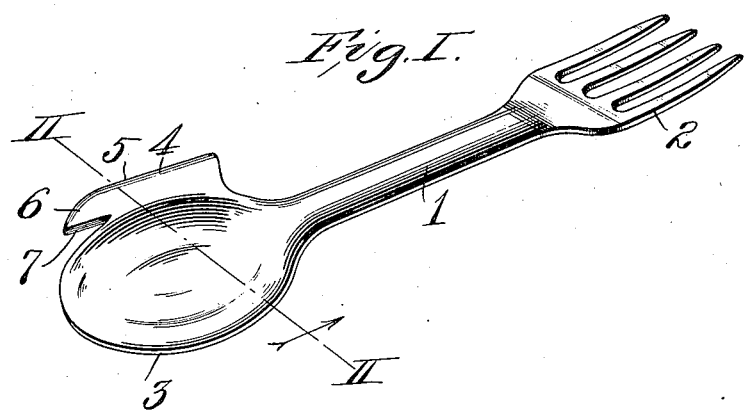
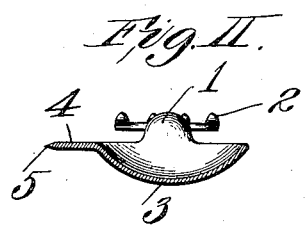
Attest:
Wm H Scott
Blanche Hogan
Inventor:
Chas. G. Aufrichtig.
by Knight Bros.
Attys.

UNITED STATES PATENT OFFICE.

CHARLES G. AUFRICHTIG, OF ST. LOUIS, MISSOURI.

COMBINED FORK, SPOON, KNIFE, AND CAN-OPENER.

No. 849,098.     Specification of Letters Patent.     Patented April 2, 1907.

Application filed March 8, 1906. Serial No. 304,874.

*To all whom it may concern:*

Be it known that I, CHARLES G. AUFRICHTIG, a citizen of the United States, residing in the city of St. Louis, in the State of Missouri, have invented certain new and useful Improvements in a Combined Fork, Spoon, Knife, and Can-Opener, of which the following is a full, clear, and exact description, reference being had to the accompanying drawings, forming part of this specification.

My invention relates to a single article having combined therein as essential elements a fork, spoon, knife, and can-opener each having its individual utility, though inseparably associated with the other coexisting features of the article.

The object of my invention is primarily to produce a combined article that may be of utility for various functions and which is designed to be particularly useful to campers, picnickers, or persons in general when they are remote from places at which the various elements that enter into my combination article are not readily at hand in individual form.

Figure I is a perspective view of my combined article, and Fig. II is a cross-section taken on line II II, Fig. I.

1 designates the shank or handle of my combination implement, at one end of which is a fork 2 and at the other end of which is a spoon 3. At one side of the spoon 3 is a knife-blade 4, provided with a cutting edge 5. (See Fig. II.) The knife-blade terminates at its forward end in a prong 6, that is slightly separated from the adjacent edge of the spoon 3 and is provided with a cutting edge 7, which faces the adjacent edge of the spoon. By separating the inner portion of the prong 6 from the adjacent edge of the spoon a crevice is rendered present between the edges of these members in order that the prong may be introduced through the head of a sheet-metal can to serve as a can-opener, when the entire article is raised and lowered to cause the cutting edge of the prong to operate with cutting action upon the can-head.

I claim—

An article of the character described, comprising a shank, a concave member at one end of said shank, a blade extending from one side of said concave member, and a prong at the forward end of said blade and having a cutting edge; all of said parts being integral with each other and the edge of the concave member opposing the cutting edge of the prong so as to serve as a backing therefor.

CHARLES G. AUFRICHTIG.

In presence of—
BLANCHE HOGEN,
NELLIE V. ALEXANDER.